United States Patent
Morales (10) Patent No.: US 8,935,765 B2
(45) Date of Patent: Jan. 13, 2015

(54) METHOD TO ENABLE MOBILE DEVICES TO RENDEZVOUS IN A COMMUNICATION NETWORK

(71) Applicant: Fluke Corporation, Everett, WA (US)

(72) Inventor: Joseph Morales, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 137 days.

(21) Appl. No.: 13/838,374

(22) Filed: Mar. 15, 2013

(65) Prior Publication Data
US 2014/0282928 A1 Sep. 18, 2014

(51) Int. Cl.
*G06F 15/16* (2006.01)
*H04L 9/32* (2006.01)
*G06F 7/04* (2006.01)
*H04L 29/06* (2006.01)

(52) U.S. Cl.
CPC .................................. *H04L 63/083* (2013.01)
USPC ................ 726/5; 713/153; 713/176; 709/227

(58) Field of Classification Search
None
See application file for complete search history.

(56) References Cited

U.S. PATENT DOCUMENTS

| | | | | |
|---|---|---|---|---|
| 8,811,258 B2* | 8/2014 | Etemad et al. | ................. | 370/312 |
| 2007/0197160 A1* | 8/2007 | Health et al. | ................. | 455/3.05 |
| 2007/0266236 A1* | 11/2007 | Colditz | ......................... | 713/153 |
| 2011/0026504 A1* | 2/2011 | Feinberg | ....................... | 370/338 |
| 2013/0326558 A1* | 12/2013 | Kuo et al. | ....................... | 725/46 |

\* cited by examiner

*Primary Examiner* — Dede Zecher
*Assistant Examiner* — Trang Doan
(74) *Attorney, Agent, or Firm* — Edwards Wildman Palmer LLP; Scott D. Wofsy; Christopher J. Capelli (57) ABSTRACT

There is provided a method to enable mobile devices to rendezvous on a shared communication service. The method includes steps for creating, via a device, a shared username and a shared password for a private channel in a communication network, determining a unique channel identification (ID) for the private channel based on the shared username and the shared password, and configuring the device with the shared username and the shared password. The method further includes steps for subscribing the device to the private channel using the unique channel ID, transmitting, in response to a discovery request, a self-identification discovery response over the private channel, and broadcasting data between the device and each additional device connected to the private channel.

20 Claims, 10 Drawing Sheets

Fig. 9B

METHOD TO ENABLE MOBILE DEVICES TO RENDEZVOUS IN A COMMUNICATION NETWORK

BACKGROUND OF THE INVENTION

1. Field of the Invention

The present disclosure relates to communication amongst devices in a shared communication network, and more particularly, to private communication channels for one or more devices in the shared communication network.

2. Description of the Related Art

Mobile devices including phones, tablets, laptop computers, and the like may need to communicate with one another for various purposes including exchanging information, collaborating, displaying remote user interfaces, and other purposes. Several difficulties exist in establishing this communication including traversing firewalls, discovering devices, security and administration.

Although conventional methods and systems such as Virtual Private Networks (VPNs) and various encryption schemes (e.g., Wired Equivalent Privacy (WEP), Encrypted Key Exchange (EKE), Password Derived Moduli (PDM), etc.) have generally been considered satisfactory for their intended purposes, a need remains for improved private communications amongst networked devices.

SUMMARY

According to one or more embodiments of the disclosure, a network testing device coupled to a communication network can create a shared username and a shared password for a private channel and determine a unique channel identification (ID) for the private channel based on the shared username and the shared password (e.g., the device can determine the unique channel ID by performing a cryptographic hash function on the shared username and the shared password to yield the unique channel ID). The device can further configure itself with the shared username and shared password, subscribe to the private channel using the unique channel ID and broadcast data to each additional device connected to the private channel. For example, the device can broadcast (e.g., transmit) a self-identification discovery response over the private channel in response to receiving a discovery request.

In some embodiments, the device can receive an authentication request having an access code of at least one additional device and validate the access code of the authentication request. The device can transmit an authentication acknowledgement to the additional device when the access code is valid and subscribing the device to a peer-to-peer (P2P) channel with the additional device once validated. If the access code is invalid, the device can transmit an authentication not acknowledged to the additional device. When connected to the P2P channel, the device can transmit a heartbeat signal to each additional device subscribed to the P2P channel to maintain device subscription. However, the device can further unsubscribe from the P2P channel when the device fails to receive a heartbeat signal from at least one additional device connected to the P2P channel within a threshold time period.

In certain additional embodiments, the network test device can be configured with one of a username and a password different from either of the shared username, the shared password, or both, which causes the device to unsubscribe from the private channel.

In one embodiment, the unique channel ID is encoded in a Quick Response (QR) code such that when the network test device subscribes to the private channel using the channel ID, the device scans the QR code to cause the device to subscribe to the private channel.

These and other features of the apparatus and methods of the subject invention will become more readily apparent to those skilled in the art from the following detailed description of the preferred embodiments taken in conjunction with the drawings.

BRIEF DESCRIPTION OF THE DRAWINGS

The embodiments herein may be better understood by referring to the following description in conjunction with the accompanying drawings in which like reference numerals indicate identically or functionally similar elements, of which.

A component or a feature that is common to more than one drawing is indicated with the same reference number in each of the drawings.

DESCRIPTION OF THE INVENTION

As noted above, a need remains for improved private communications amongst networked devices to overcome difficulties such as traversing firewalls, discovering devices, security, administration and the like. Accordingly, the techniques provided herein provide improved private communication amongst devices in a communication network by using user-defined credentials to establish a secure encrypted channel on a shared communication network/service (e.g., hosted on the Internet). These techniques particularly determine unique channel identifications (IDs) as well as encryption keys to establish secure and private communication amongst particular devices, thereby allowing such devices to discover each other and rendezvous.

A communication network can include various devices such as mobile devices (e.g., mobile phones), tablets, personal computers, or other devices, interconnected by communication links and segments for transporting data between end nodes. Various types of network are available and can include, for example, local area networks (LANs), wide area networks (WANs), etc. Each of these networks can connect the nodes over dedicated private communication links, or dispersed nodes over long-distance communications links such as common carrier telephone lines, optical lightpaths, synchronous optical networks (SONET), synchronous digital hierarchy (SDH) links, or Powerline Communications (PLC), and others.

Figure 1:
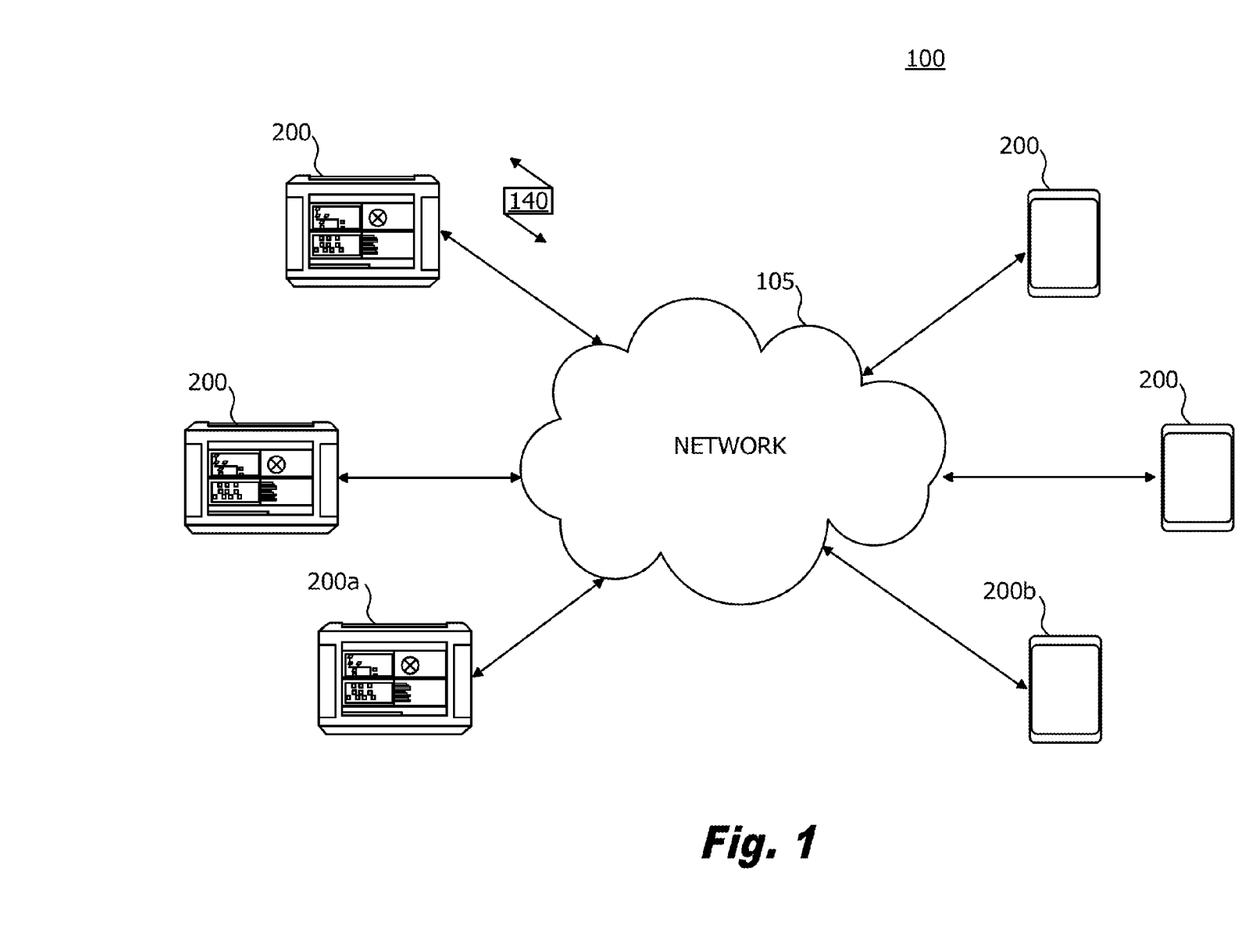
FIG. 1 illustrates a schematic diagram of an example communication network, showing various network test devices and client devices.

FIG. 1 is a schematic block diagram 100, showing various device(s) 200 coupled to a network 105. In particular, one of the devices 200 includes a device 200a, which represents a network test device, while another of the devices 200 includes a device 200b, which represents a client device (e.g., a mobile phone). Device(s) 200 can communicate or exchange data packets 140 with each other over network 105 via, for example predefined network communication protocols as will be appreciated by those skilled in the art, such as various wired protocols, wireless protocols etc., where appropriate. In this context, a protocol consists of a set of rules defining how the devices interact with each other. Those skilled in the art will understand that any number of devices, links, etc. may be used in the communication network 105, and that the view shown herein is for simplicity.

Figure 2:
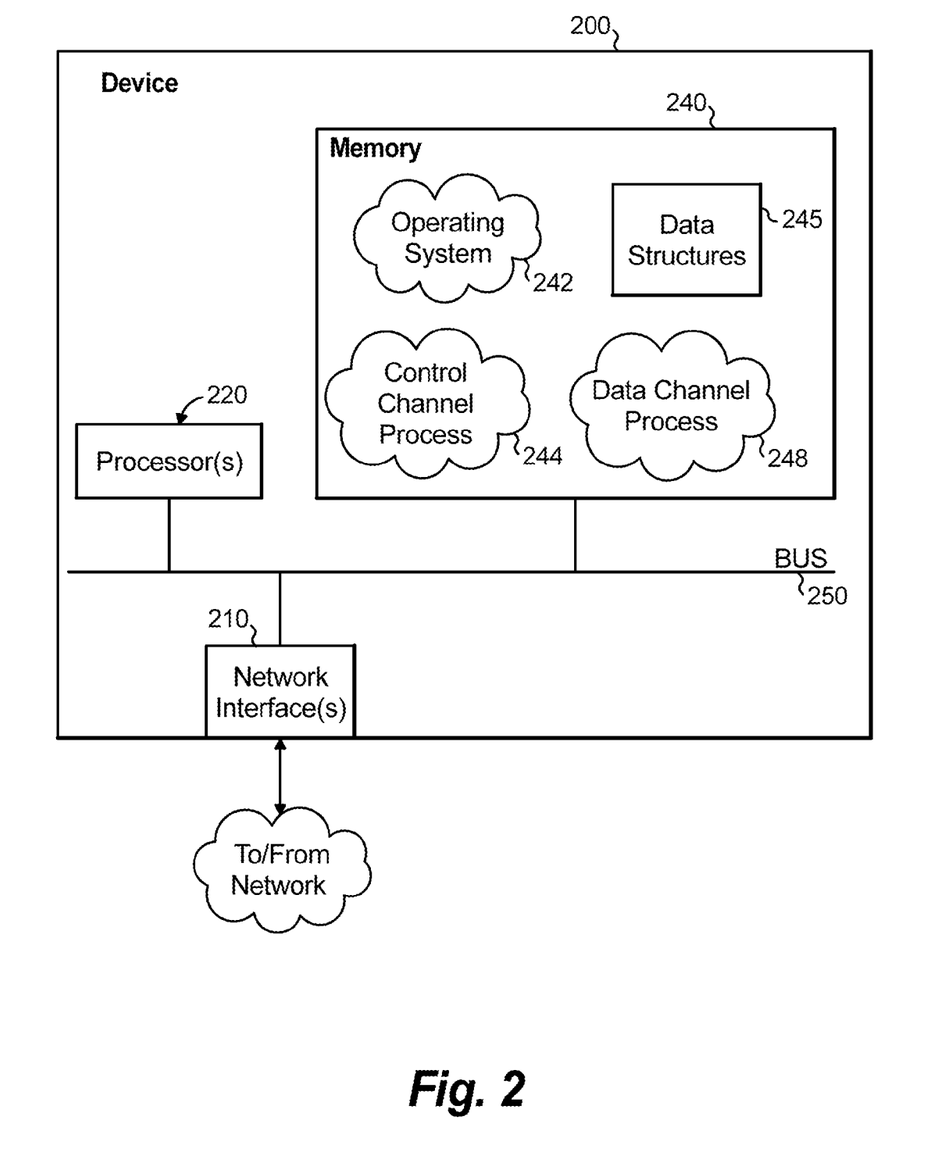
FIG. 2 illustrates an example test network device shown in FIG. 1.

FIG. 2 is a schematic block diagram of a simplified example device 200 that may be used with one or more embodiments described herein, e.g., as any of the devices 200 (including devices 200a and 200b) shown in FIG. 1 above. Device 200 may comprise one or more network interfaces 210 (e.g., wired, wireless, etc.), at least one processor 220, and a memory 240 interconnected by a system bus 250.

The network interface(s) 210 contain the mechanical, electrical, and signaling circuitry for communicating data over network 105. Network interfaces 210 may be configured to transmit and/or receive data using a variety of different communication protocols. Note that each device may include two different types of network connections 210, e.g., wireless and wired/physical connections, and that the view herein is merely for illustration.

Memory 240 comprises a plurality of storage locations that are addressable by the processor 220 and the network interfaces 210 for storing software programs and data structures associated with the embodiments described herein. Processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise control channel process/services 244, and a data channel process 248, as described herein.

Note further that while both processes 244 and 248 are shown as installed in a memory 240, and therefore being implemented in software, these processes could be implemented in any of hardware (e.g., electronic circuitry), firmware, software, or a combination thereof. Alternatively, these processes may be configured on a storage medium for subsequent loading into memory 215. The storage medium can include a computer-readable medium encoded with a computer program, and can be any conventional storage medium that stores the processes thereon in tangible form. Examples of storage media include a compact disk, a magnetic tape, a read only memory, an optical storage media, universal serial bus (USB) flash drive, etc. Alternatively, storage media can include a random access memory, or other type of electronic storage, located on a remote storage system and coupled to processor 220, via network interface 210.

As will be apparent to those skilled in the art other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, the techniques provide improved private communication amongst devices in a communication network by using user-defined credentials to establish a secure encrypted channel on a shared communication network/service (e.g., hosted on the Internet). Such techniques can be performed by, for example, a network testing device and/or a client device. Illustratively, these techniques described herein may be performed by hardware, software, and/or firmware, such as in accordance with the control channel process 244 (e.g., when executed on a device 200 as described below), and the data channel process 248, which may each contain computer executable instructions executed by processor 220 to perform functions relating to the techniques described herein.

Operationally, under the control of control channel process 244 a network test device 200a of computer network 105, or else a client device 200b creates a shared username and a shared password for a private channel, determines a unique channel identification (ID) for the private channel based on the shared username and the shared password and is configured with the shared username and the shared password. The device further subscribes to the private channel using the unique channel ID, and transmits, in response to a discovery request, a self-identification discovery response. The device further broadcasts data to each additional device connected to the private channel.

Figure 3:
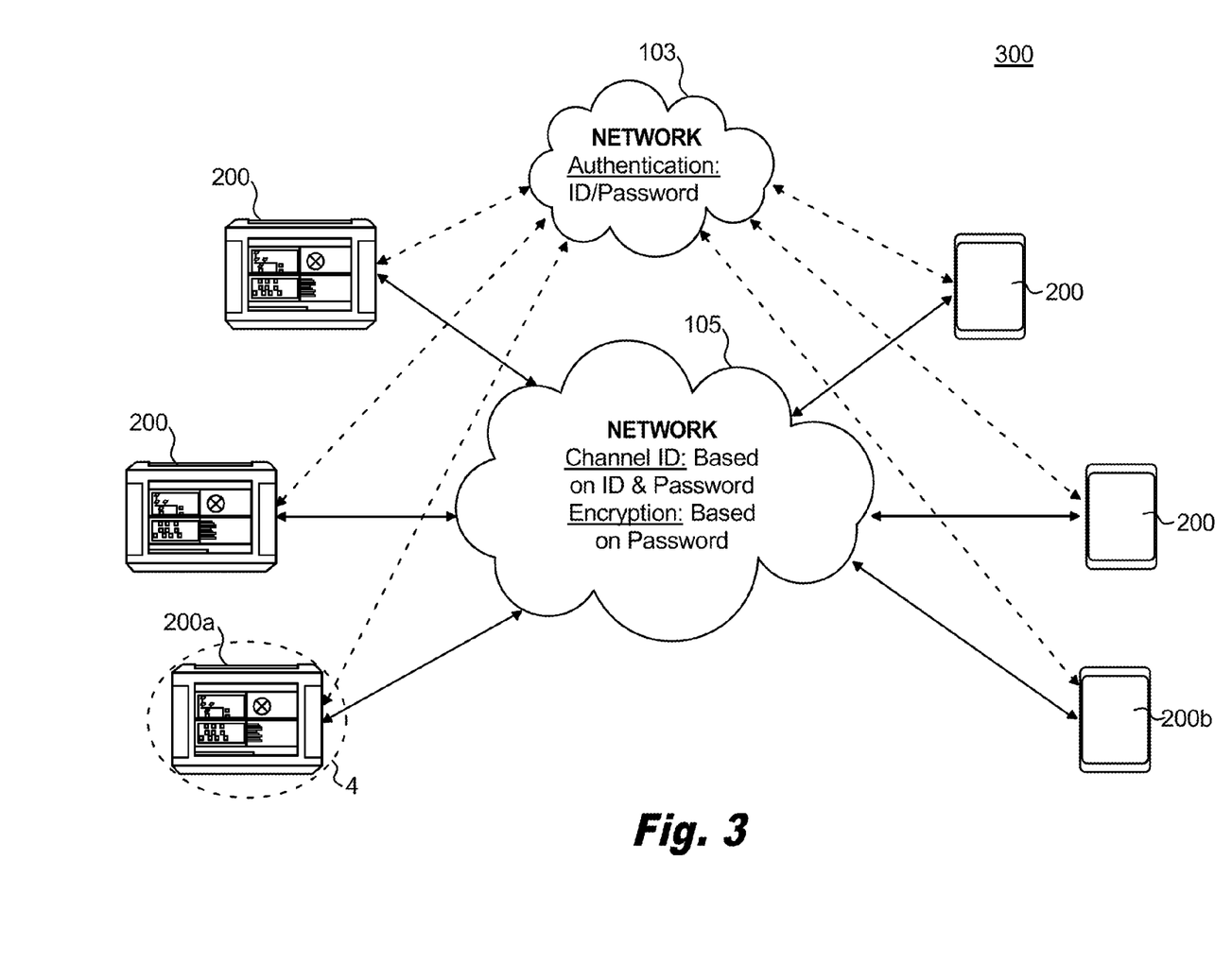
FIG. 3 illustrates an example schematic diagram including an authentication network and a control network.

For example, FIG. 3 provides a schematic diagram 300 that includes an authentication network 103 and a control network 105, which control network 105 is a shared communication network amongst various devices 200. In operation, a network test device 200a establishes and subscribes to a private channel using a unique channel ID (based upon the shared username and shared password). As shown, each of devices 200 communicate a shared username (i.e., "ID") and shared password with a server or servers (not shown) in an authentication network 103. The server can save the shared username/password and provide rudimentary indications or alerts to additional devices that attempt to subscribe to a particular private channel. Such rudimentary indications or alerts can include status regarding activity or presence of already-joined devices on the particular private channel. In some embodiments client devices cannot join a private channel unless a network testing device first establishes a shared username and a shared user password with the server(s) in authentication network 103.

Figure 4:
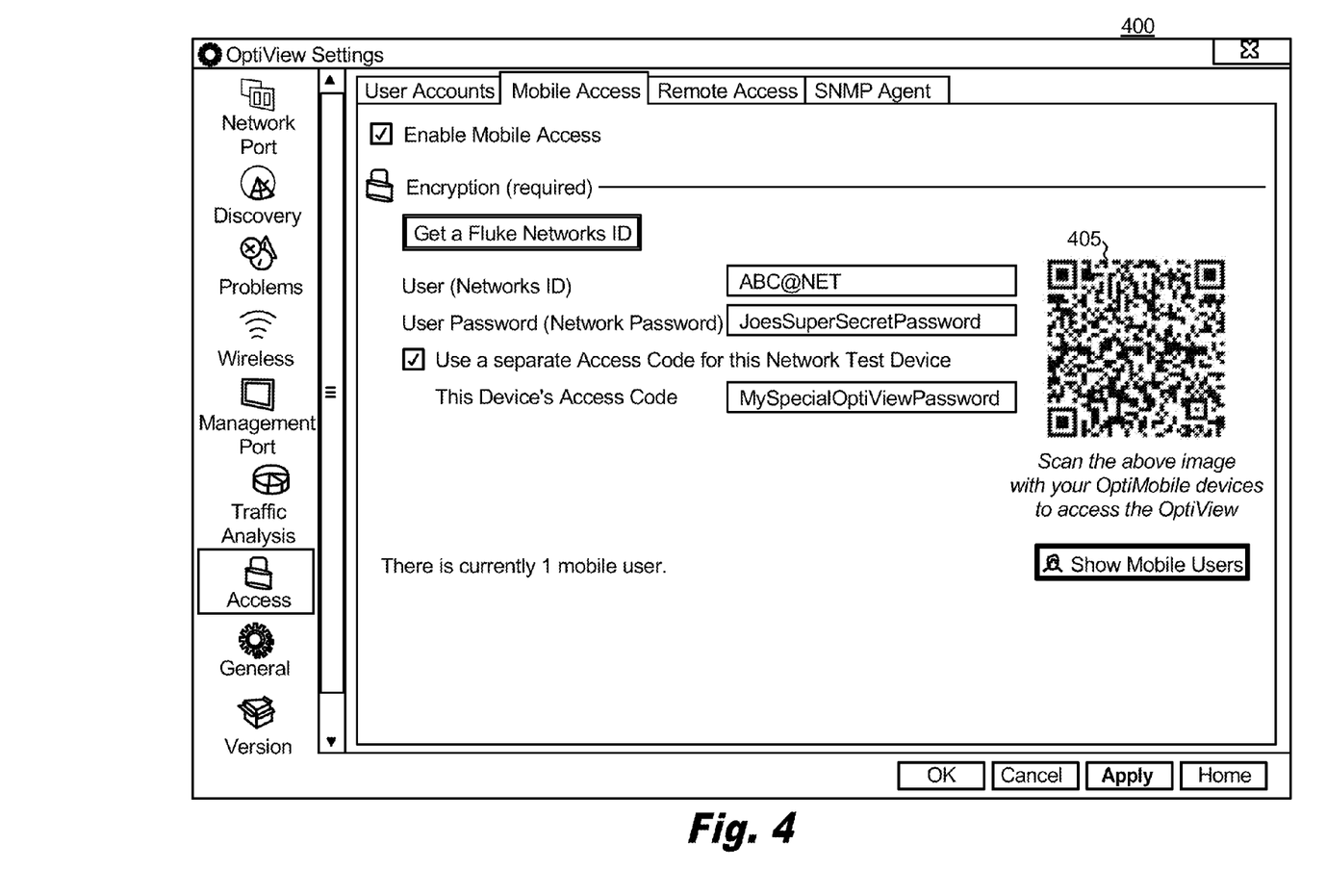
FIG. 4 illustrates an example user interface view of the network test device shown in FIG. 2.

With respect to the shared username and a shared user password, FIG. 4 illustrates an example user interface 400 of the network test device 200a, shown in FIG. 2. As shown, the network testing device 200a is configured with a shared username "ABC@net" and a shared password "JoesSuperSecretPassword". Based on the shared username and the shared password, network testing device 200a can determine a unique channel identification for a private channel in network 105. Additionally, in some embodiments, unique channel ID is encoded in a Quick Response (QR) code 405. Device 200a and/or client device(s) 200b can subscribe to the private channel in network 105 by scanning the QR code, which can cause the corresponding device to subscribe to the private channel. In certain other embodiments, the network testing device can include an additional access code "MySpecialOptiViewPassword", which can be used to validate an authentication acknowledgement, as discussed below.

Figure 5:
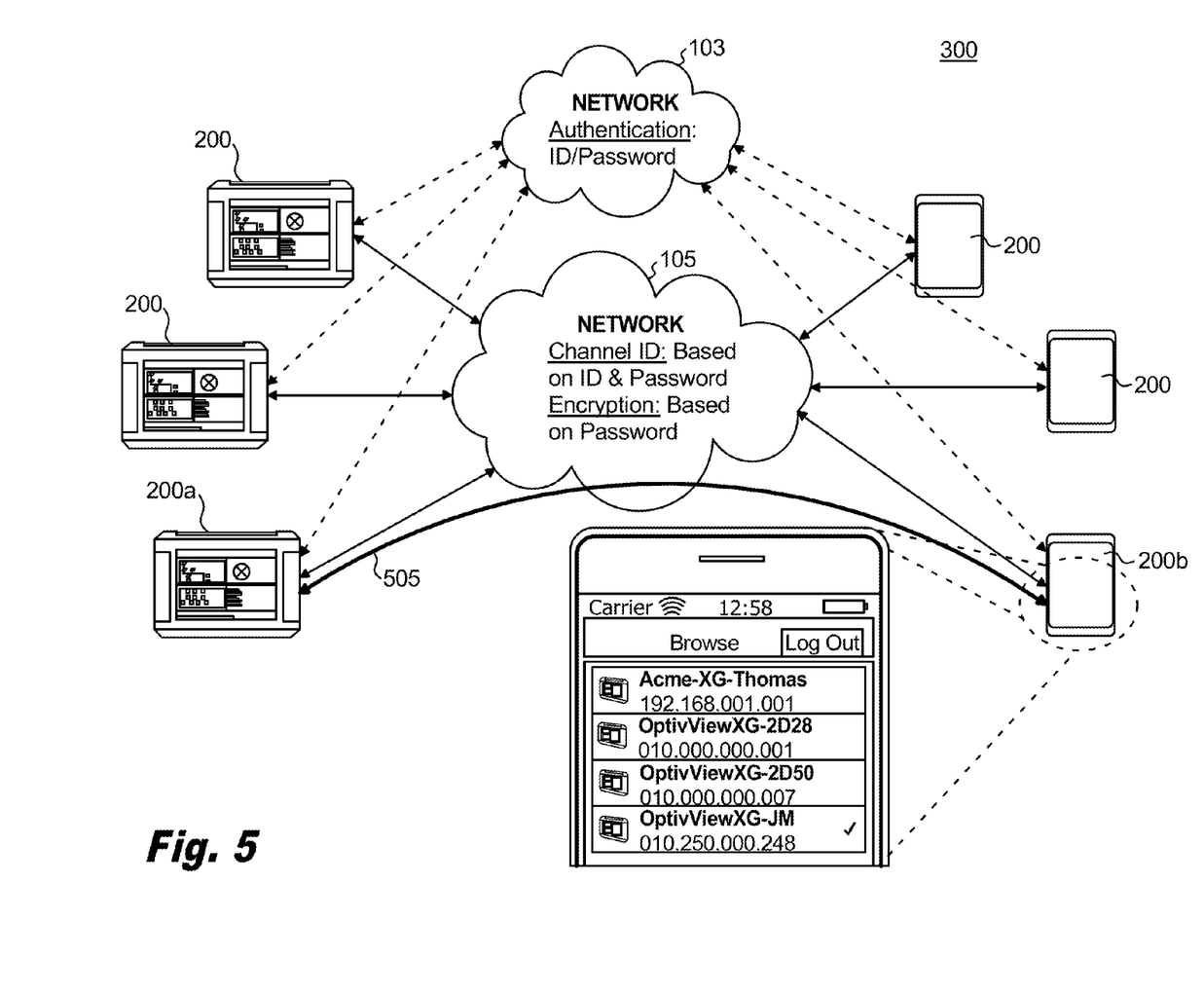
FIG. 5 illustrates the example schematic diagram of FIG. 3, showing a private channel between a network test device and a client device.

Referring now to FIG. 5, there is shown a private channel between network testing device 200a and client device 200b. As discussed above, network testing device 200a determines the unique channel ID for the private channel (i.e., shown as private channel 505) based on the shared username and the shared password and subscribes to the private channel. In preferred embodiments, the unique channel ID can be determined by performing a cryptographic hash function on the shared username and the shared password. Additional devices (i.e., client device 200b), using the shared username and the shared password can likewise determine the unique channel ID for private channel 505 and join or subscribe thereto.

Once subscribed, a client device can select a particular network testing device to setup an additional data channel (e.g., a peer-to-peer (P2P) channel. Referring to an enhanced view of client device 200b, client device 200b selects to join or subscribe to a data channel of OptiViewXG-JM (i.e., network testing device 200a). In operation, various network testing devices and client devices are coupled to network 105. A client device—shown here as client device 200b—broadcasts a discovery request to each network testing device of private channel 505 and each network testing device, in turn, receives the discovery request and self-identifies. Client device 200b can attempt to subscribe to a data channel with a particular network device 200a, via an authentication request. Notably, the network testing device 200a and/or the client device 200b can be configured with either a different shared username and/or a different shared password to cause the respective device to unsubscribe from the private channel.

Figure 6:
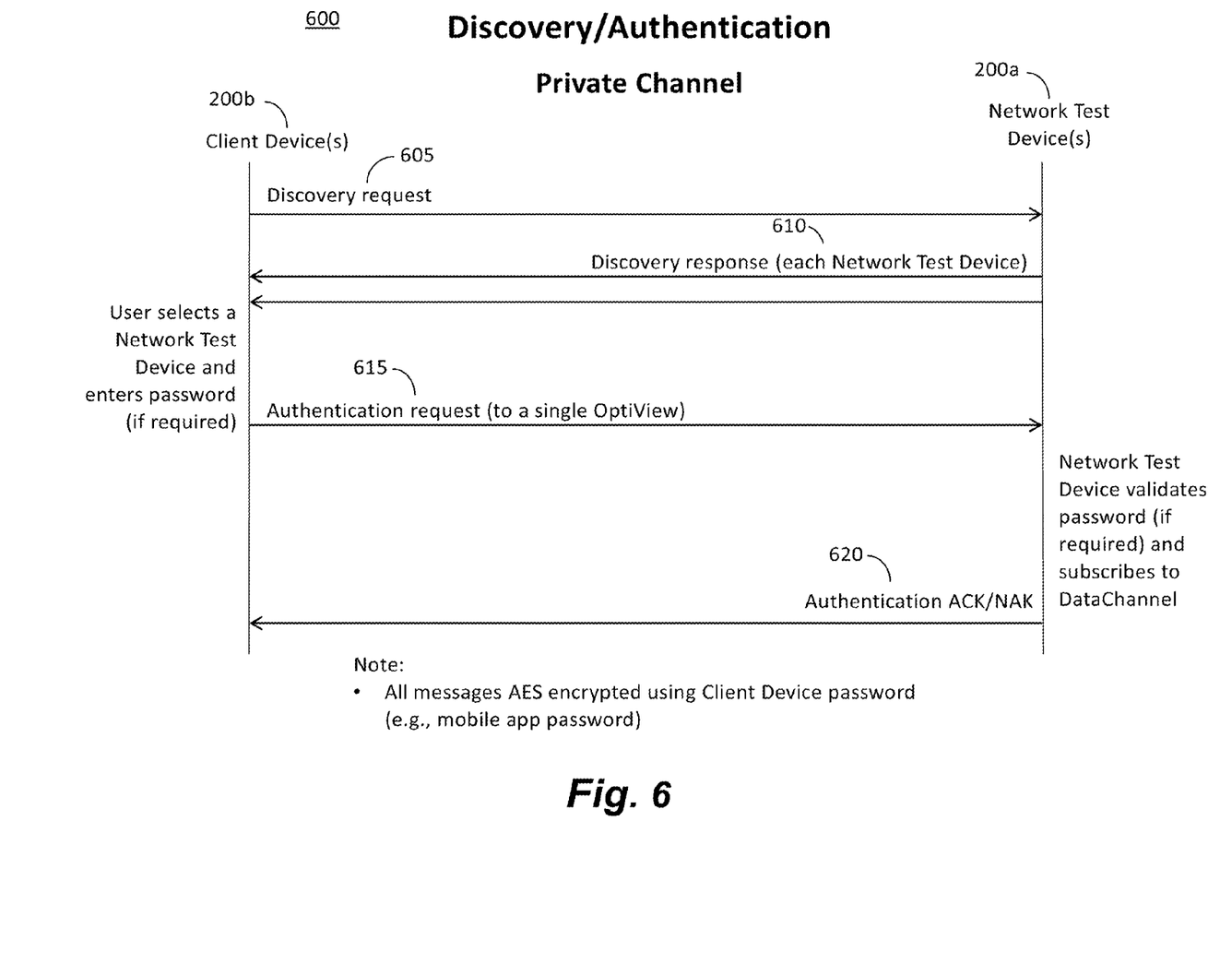
FIG. 6 illustrates an example schematic showing signal or data transmission for discovery or authentication.

This discovery or authentication process is particularly illustrated in schematic 600 of FIG. 6. As shown, a discovery request 605 is transmitted from client device 200b to a network testing device 200a over private channel 505. Network testing devices, in response to discovery request 605 transmit a discovery response 610. Client device 200a then selects a particular networking test device 200b, which it desires to share a peer-to-peer (P2P) channel with. Once selected, client device 200a sends an authentication request 615. In some embodiments, authentication request 615 includes an access code (discussed with respect to FIG. 4 above). The authentication request 615 is received by the network testing device 200a and validated against the resident access code of network testing device 200a. Network testing device 200a transmits an authentication acknowledgement (ACK) 620 to client device 200b when the access code is valid and subscribe to the P2P channel with the client device 200b. However, when the access code is invalid, network testing device 200a transmits an authentication non-acknowledgement (NAK) 620 and does not join the P2P channel. Notably, discovery and authentication requests and responses can be encrypted using AES encryption based on a client device 200b password.

Figure 7:
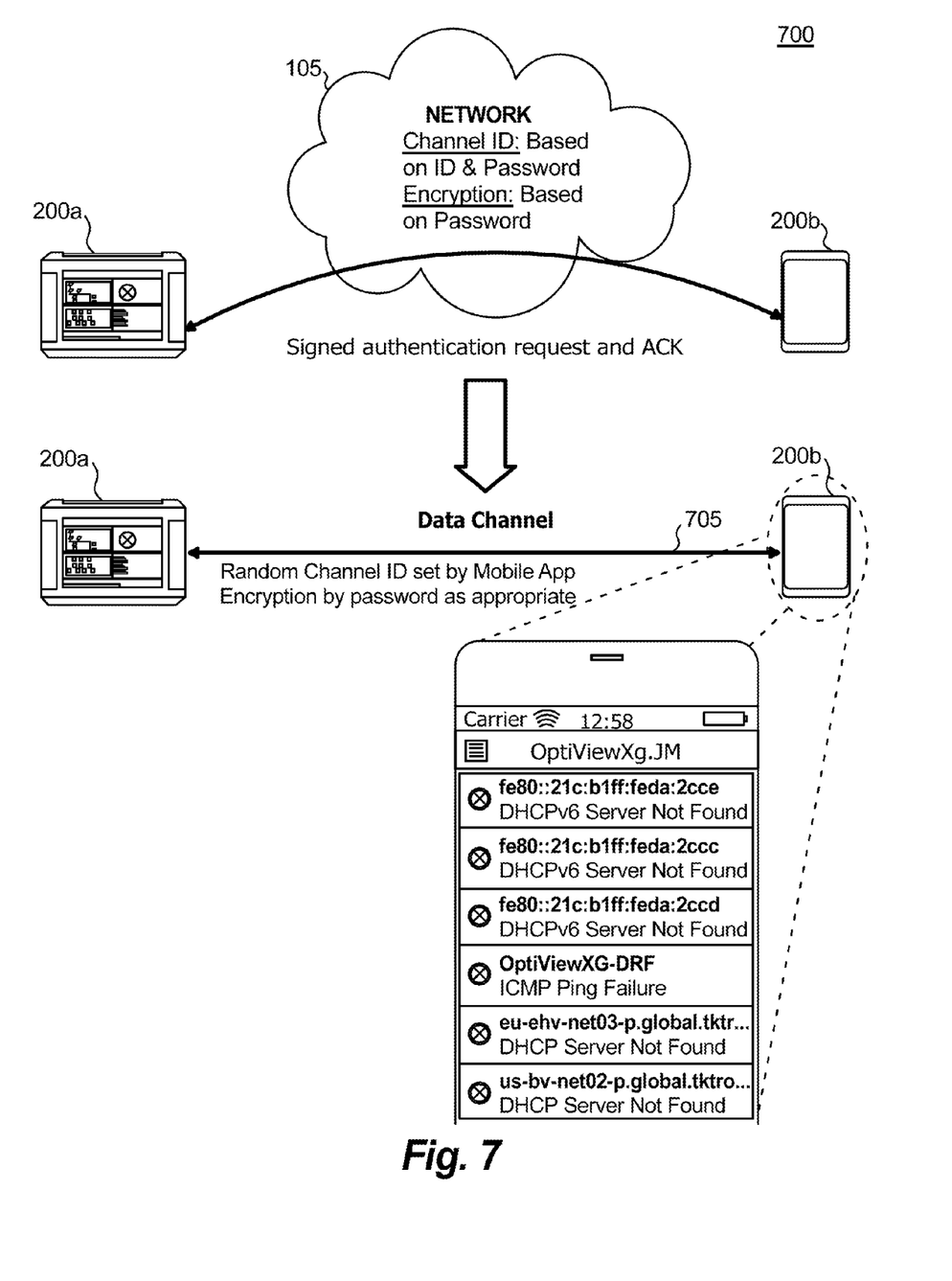
FIG. 7 illustrates a schematic diagram of a data channel between the network test device and the client device shown in FIG. 5.

FIG. 7 illustrates a schematic diagram 700 of a data channel between network test device 200a and client device 200b when the authentication request is acknowledged (ACK). As discussed above, when network testing device 200b sends the authentication request acknowledged, it then subscribes to a P2P channel, shown as data channel 705. Data channel 705 is a P2P channel and allows network testing device 200a to communicate directly with client device 200b. Such P2P channel can be setup using, for example a TCP socket connection between the two devices. The data channel allows these devices to communicate network test data, including, but not limited to network problems (e.g. key network services not responding) and network performance statistics (such as latency, loss, jitter, etc.).

Figure 8:
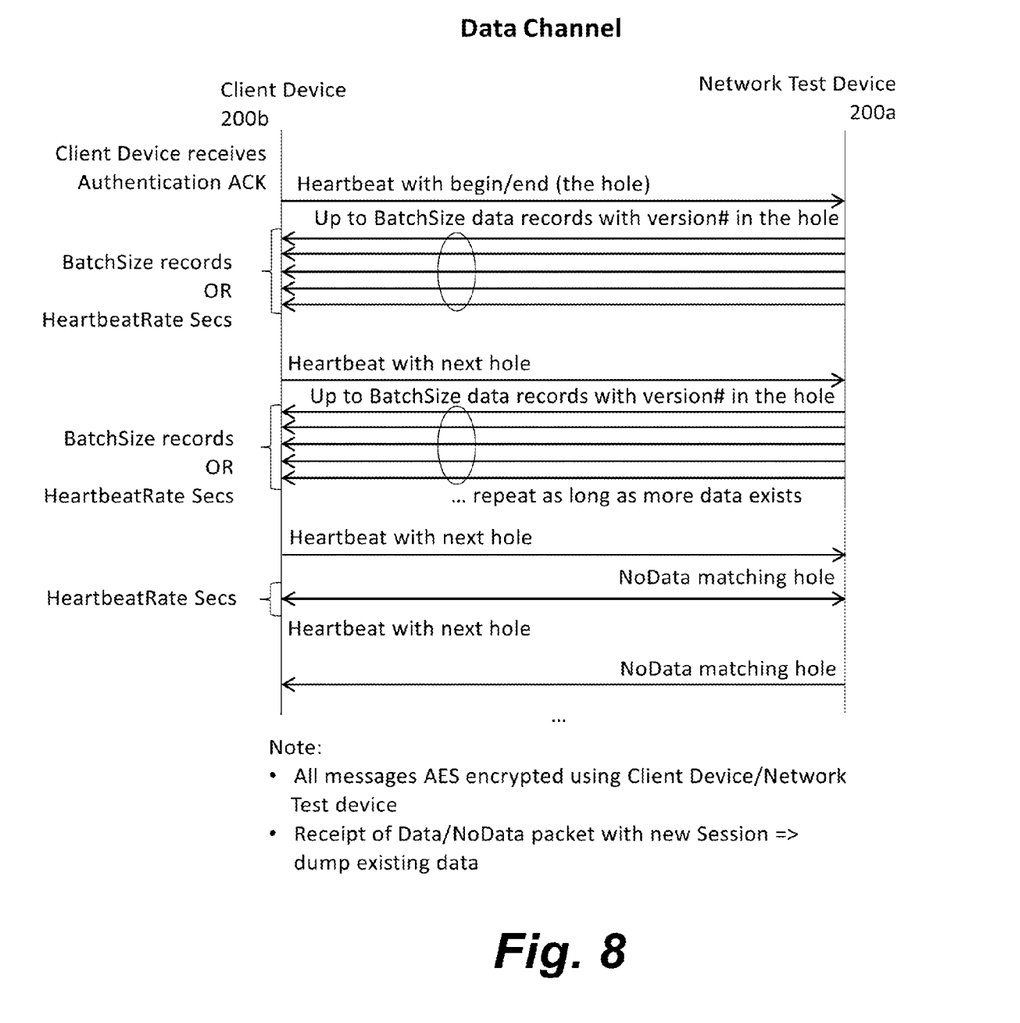
FIG. 8 illustrates an example schematic showing signal or data transmission for the data channel shown in FIG. 7.

FIG. 8 illustrates an example schematic 800 signal flow or data transmission over the data channel (i.e., the P2P channel), shown in FIG. 7. As illustrated, client device 200b and network testing device 200a can exchange data (i.e., "Batch-Size records"). Additionally, each of the devices can transmit heartbeat signals to maintain data channel subscription. That is, each device connected to the data channel—here, client device 200b and network testing device 200b—can include time-out parameters whereby when a heartbeat data packet is not received within a threshold period of time, respective subscriptions to the data channel are dropped.

Figure 9A:
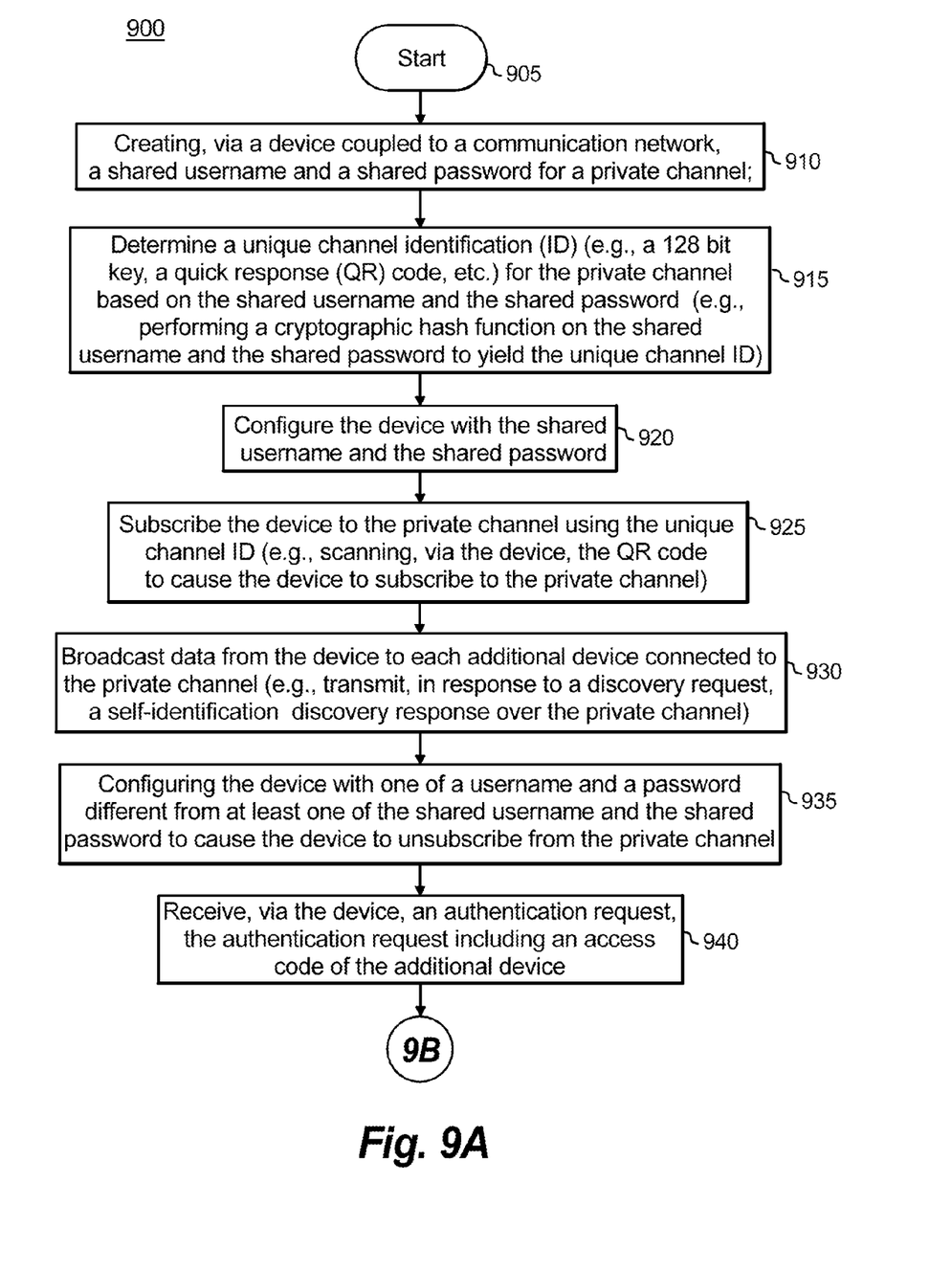
FIGS. 9A-9B illustrate an example simplified procedure for establishing a private communication channel relative to the network test device.
Figure 9B:
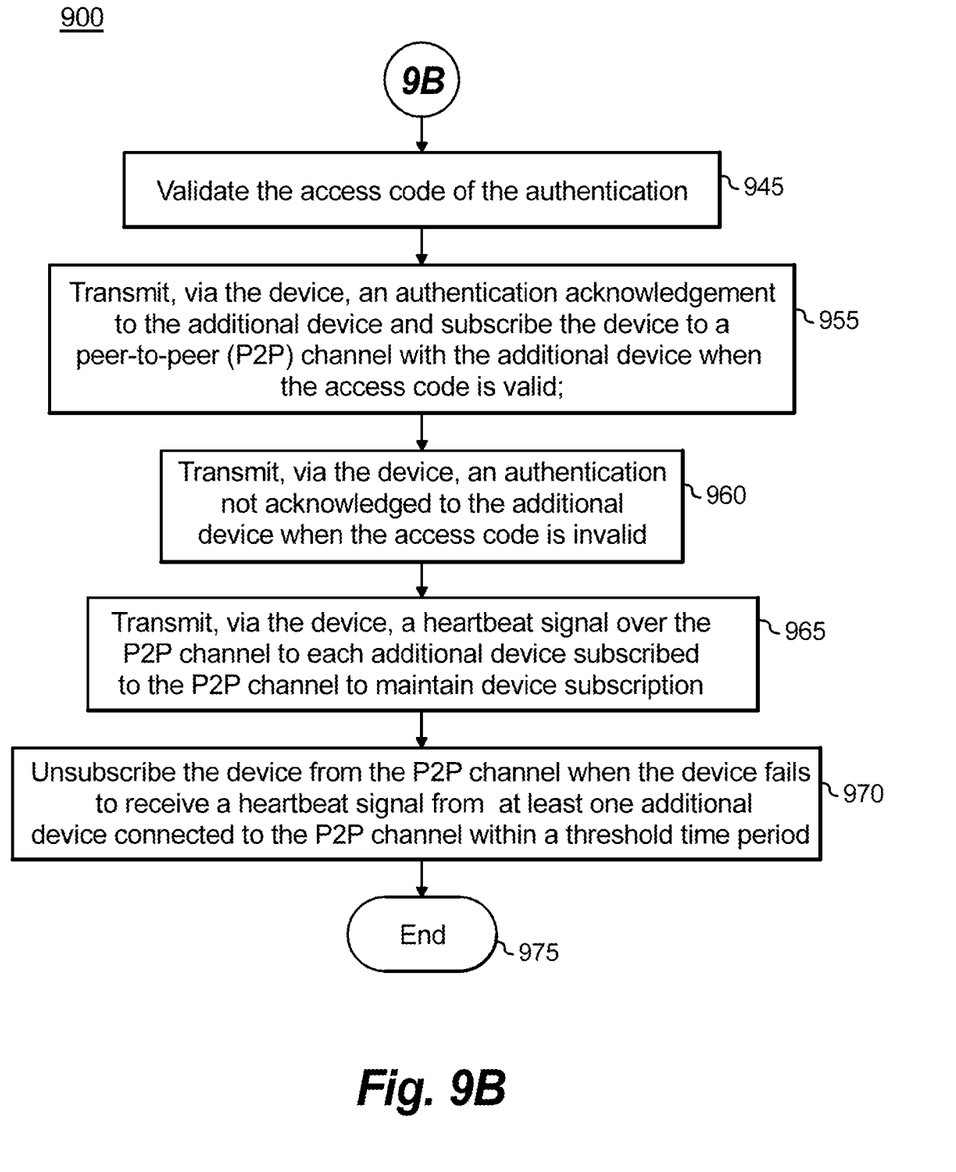

FIGS. 9A-9B illustrate an example simplified procedure 900 for establishing a private communication channel in accordance with one or more embodiments described herein, particularly from the perspective of network test device 200a. Procedure 900 starts at step 905, and continues to step 710, where, as described in greater detail above, the network test device can create a shared username and a shared password for a private channel. Next, in step 915, the network testing device can determine a unique channel identification (ID) for a private channel based on the shared username and the shared password. The unique channel ID can be determined by, for example, performing a cryptographic hash function on the shared username and the shared password to yield a 128 bit encryption key, a Quick Response (QR) code, etc. Once determined, the network test device can configure itself with the shared username and the shared user password, shown in step 920. The network testing device, as discussed above, can subscribe (in step 925) to the private channel using the unique channel ID. For example, in some embodiments, the network testing device can scan the QR code, which causes the device to subscribe to the private channel. In step 930, the network testing device can broadcast data to each additional device connected to the private channel. As discussed above, network testing device can receive a discovery request from the client device and in response, the network testing device can transmit a self-identification discovery response over the private channel. Additionally, the network testing device can be configured with one of a username and a password different from at least one of the shared username and the shared password to cause the network testing device to unsubscribe from the private channel, as shown in step 935.

As discussed above, in some embodiments, shown in step 940, the network testing device can receive an authentication request of at least one additional device (e.g., from a client device), which request can also include an access code. If the access code is present, in step 945 the network device can validate the access code of the authentication request. When the access code is valid, the network testing device in step 950 can transmit an authentication acknowledgement to the additional device and subscribe to a peer-to-peer (P2P) channel with the additional device. However, in step 955, the network testing device can transmit an authentication not acknowledged to the additional device when the access code is invalid. As discussed above, when the network testing device (and/or client device) is connected to the P2P channel, the network testing device can transmit a heartbeat signal over the P2P channel to each additional device subscribed to the P2P channel to maintain device subscription, shown in step 960. However, in step 965, the network testing device can also unsubscribe from the P2P channel when it fails to receive a heartbeat signal from at least one additional device connected to the P2P channel within a threshold time period. Procedure 900 may subsequently end in step 970, or may restart at step 905, where the network testing device creates a shared username and a shared password for a private channel.

It should be noted that certain steps within procedures 900 may be optional as described above and that the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described from the perspective of a network testing device, such steps can be readily adapted to a client device, as is understood by those skilled in the art.

The techniques described herein, therefore, provide for improved private communication amongst devices in a communication network by using user-defined credentials to establish a secure encrypted channel on a shared communication network/service (e.g., hosted on the Internet). In particular, the techniques described herein provide for creating a unique channel ID based on both a shared username and a shared user password. This guarantees that communication channels using the unique channel IDs are private for particular devices. Additionally, once the private channel is established, devices can request a P2P channel for subsequent data exchange.

While there have been shown and described illustrative embodiments that provide for configuration of devices to communicate on a particular network channels, it is to be understood that various other adaptations and modifications may be made within the spirit and scope of the embodiments herein. For example, the embodiments in their broader sense are not limited to execution from a specific network testing device or a client device, but may, in fact, be used with any suitable devices/configurations.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   creating, via a device coupled to a communication network, a shared username and a shared password for a private channel;
   determining a unique channel identification (ID) for the private channel based on the shared username and the shared password;
   configuring the device with the shared username and the shared password;
   subscribing the device to the private channel using the unique channel ID; and
   broadcasting data from the device to each additional device connected to the private channel.

2. The method of claim 1 further comprising:
   receiving, via the device, an authentication request, the authentication request including an access code of at least one additional device;
   validating the access code of the authentication request;
   transmitting, via the device, an authentication acknowledgement to the additional device when the access code is valid;
   subscribing the device to a peer-to-peer (P2P) channel with the additional device when the access code is valid; and
   transmitting, via the device, an authentication not acknowledged to the additional device when the access code is invalid.

3. The method of claim 2, further comprising:
   transmitting, via the device, a heartbeat signal over the P2P channel to each additional device subscribed to the P2P channel to maintain device subscription.

4. The method of claim 3, further comprising:
   unsubscribing the device from the P2P channel when the device fails to receive a heartbeat signal from at least one additional device connected to the P2P channel within a threshold time period.

5. The method of claim 1, further comprising:
   configuring the device with one of a username and a password different from at least one of the shared username and the shared password to cause the device to unsubscribe from the private channel.

6. The method of claim 1, wherein determining the unique channel ID for the private channel comprises:
   performing a cryptographic hash function on the shared username and the shared password to yield the unique channel ID.

7. The method of claim 1, wherein the unique channel ID is encoded in a Quick Response (QR) code, wherein subscribing the device to the private channel using the unique channel ID further comprises:
   scanning, via the device, the QR code to cause the device to subscribe to the private channel.

8. The method of claim 1, wherein broadcasting data from the device to each additional device connected to the private channel comprises:
   transmitting, in response to a discovery request, a self-identification discovery response over the private channel.

9. An apparatus, comprising:
   one or more network interfaces of a device in a communication network;
   a processor coupled to the network interfaces and adapted to execute one or more processes; and
   a memory configured to store a process executable by the processor, the process when executed operable to:
      create a shared username and a shared password for a private channel in the communication network;
      determine a unique channel identification (ID) for the private channel based on the shared username and the shared password;
      configure the device with the shared username and the shared password;
      subscribe the device to the private channel using the unique channel ID;
      transmit, in response to a discovery request, a self-identification discovery response over the private channel; and
      broadcast data between the device and each additional device connected to the private channel.

10. The apparatus as in claim 9, wherein the process, when executed, is further operable to:
   receive an authentication request, the authentication request including an access code of at least one additional device;
   validate the access code of the authentication request;

transmit an authentication acknowledgement to the additional device when the access code is valid;
subscribe the device to a peer-to-peer (P2P) channel with the additional device when the access code is valid; and
transmit an authentication not acknowledged to the additional device when the access code is invalid.

11. The apparatus as in claim 10, wherein the process, when executed, is further operable to:
transmit a heartbeat signal over the P2P channel to each additional device subscribed to the P2P channel to maintain device subscription.

12. The apparatus as in claim 11, wherein the process, when executed, is further operable to:
unsubscribe the device from the P2P channel when the device fails to receive a heartbeat signal from at least one additional device connected to the P2P channel within a threshold time period.

13. The apparatus as in claim 9, wherein the process, when executed, is further operable to:
configuring the device with one of a username and a password different from at least one of the shared username and the shared password to cause the device to unsubscribe from the private channel.

14. The apparatus as in claim 9, wherein the process, when executed to broadcast data between the device and each additional device connected to the private channel, is further operable to:
transmit, in response to a discovery request, a self-identification discovery response over the private channel.

15. A tangible, non-transitory, computer-readable media having software encoded thereon, the software, when executed by a processor, operable to:
create a shared username and a shared password for a private channel in the communication network;
determine a unique channel identification (ID) for the private channel based on the shared username and the shared password;
configure the device with the shared username and the shared password;
subscribe the device to the private channel using the unique channel ID; and
broadcast data between the device and each additional device connected to the private channel.

16. The computer-readable media of claim 14, wherein the software, when executed by a processor, is further operable to:
receive an authentication request, the authentication request including an access code of at least one additional device;
validate the access code of the authentication request;
transmit an authentication acknowledgement to the additional device when the access code is valid;
subscribe the device to a peer-to-peer (P2P) channel with the additional device when the access code is valid; and
transmit an authentication not acknowledged to the additional device when the access code is invalid.

17. The computer-readable media of claim 15, wherein the software, when executed by a processor, is further operable to:
transmit a heartbeat signal over the P2P channel to each additional device subscribed to the P2P channel to maintain device subscription.

18. The computer-readable media of claim 16, wherein the software, when executed by a processor, is further operable to:
unsubscribe the device from the P2P channel when the device fails to receive a heartbeat signal from at least one additional device connected to the P2P channel within a threshold time period.

19. The computer-readable media of claim 14, wherein the unique channel ID is encoded in a Quick Response (QR) code, wherein the software, when executed by a processor to subscribe the device to the private channel using the unique channel ID is further operable to:
scan, via the device, the QR code to cause the device to subscribe to the private channel.

20. The computer-readable media of claim 14, wherein the software, when executed by a processor to determine the unique channel ID for the private channel is further operable to
perform a cryptographic hash function on the shared username and the shared password to yield the unique channel ID.

* * * * *